(12) United States Patent
Saiki et al.

(10) Patent No.: US 6,838,185 B2
(45) Date of Patent: Jan. 4, 2005

(54) ADHESIVE USED FOR POLARIZING PLATE AND OPTICAL MEMBER

(75) Inventors: Yuuji Saiki, Ibaraki (JP); Masayuki Satake, Ibaraki (JP); Yasushi Takahashi, Ibaraki (JP); Takashi Shouda, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 198 days.

(21) Appl. No.: 09/997,433

(22) Filed: Nov. 27, 2001

(65) Prior Publication Data

US 2003/0098120 A1 May 29, 2003

(51) Int. Cl.[7] .................................................. G02B 5/30
(52) U.S. Cl. ........................ 428/500; 428/522; 428/910; 359/500; 359/483
(58) Field of Search ................................. 428/520, 522, 428/910; 359/500, 483

(56) References Cited

U.S. PATENT DOCUMENTS

| 4,810,523 | A | * | 3/1989 | Williams et al. ............ 427/505 |
|---|---|---|---|---|
| 5,049,427 | A | * | 9/1991 | Starzewski et al. ......... 428/40.4 |
| 5,768,019 | A | * | 6/1998 | Niwa et al. .................. 359/602 |
| 5,795,650 | A | * | 8/1998 | Watanabe et al. ...... 428/355 AC |
| 6,051,289 | A | * | 4/2000 | Tsujimoto et al. .......... 428/1.31 |
| 6,074,729 | A | * | 6/2000 | Watanabe et al. ............ 428/212 |
| 6,147,738 | A | * | 11/2000 | Okamoto ..................... 349/122 |
| 6,440,259 | B1 | * | 8/2002 | Patel ........................... 156/332 |
| 6,572,979 | B1 | * | 6/2003 | Wollak et al. ............... 428/516 |
| 2003/0054166 | A1 | * | 3/2003 | Chang et al. .......... 428/355 AC |
| 2003/0124338 | A1 | * | 7/2003 | Inagaki et al. ............ 428/317.9 |

FOREIGN PATENT DOCUMENTS

| FR | 2 729 476 | * | 7/1996 |
|---|---|---|---|
| WO | WO 99/43498 | * | 9/1999 |

* cited by examiner

Primary Examiner—D. Lawrence Tarazano
(74) Attorney, Agent, or Firm—Westerman, Hattori, Daniels & Adrian LLP

(57) ABSTRACT

An acrylic derived adhesive that is used for attachment of a polarizing plate having a difference of no more than 5% between an initial gel ratio and a gel ratio after the adhesive is heated at 80° C. for 500 hours is efficiently used as adhesive for polarizing plate excellent in long-term preservation quality and for optical member.

7 Claims, 1 Drawing Sheet

ADHESIVE USED FOR POLARIZING PLATE AND OPTICAL MEMBER

BACKGROUND OF THE INVENTION

1. Field of the Invention

The present invention relates to an acrylic derived adhesive used for attachment of polarizing plate, to the acrylic derived adhesive for polarizing plate excellent in long-term preservation quality, and to an optical member using the adhesive.

2. Description of the Prior Art

In liquid crystal display (LCD), a constitution is generally used in which a polarizing plate, an elliptically polarizing plate, a polarizing plate with a compensating film, a polarizing plate with reflective/transflective layer, and a polarizing plate with a brightness enhanced film are laminated onto a liquid crystal cell through adhesive. In manufacturing method of such LCD, for the purpose of preventing of variation in quality, and of improving efficiency of LCD assembly line, etc., a method is used in which optical member is adhered onto a liquid crystal cell in a state where adhesive layer is applied beforehand thereon. In that case, as adhesive, acrylic derived adhesive that is excellent in optical transparency, shows moderate tacky adhesive properties, such as wettability and cohesiveness, and is excellent in weatherability, heat resistance, etc. is widely used. In addition, an acrylic derived adhesive is an adhesive that has acrylic derived polymer as base polymer, and usually, since a peroxide may be used in polymerization of the acrylic derived polymer, the adhesive contains a residual component originating in peroxide.

However, it is known that when long time passes until a polarizing plate is used for attachment after an acrylic derived adhesive is applied on the polarizing plate, physical properties of the adhesive may change or adhesive strength may be decreased after attached on a liquid crystal display, and then peeling may be observed in a durability examination. A cause of change in physical properties of the adhesive is not clarified until now, and an effective index for improving long-term preservation quality of the adhesive is not obtained.

Then, an object of the present invention is to provide an adhesive for polarizing plate that is excellent in long-term preservation quality, and an other object of the present invention is to provide an optical member using the adhesive.

SUMMARY OF THE INVENTION

As a result of a wholehearted research by the present inventors to attain the above-mentioned object, it was found out that a cross-linking reaction is caused by a peroxide component that remains in an acrylic derived adhesive, and then physical properties after long-term preservation of the adhesive change, and that a progress of the cross-linking reaction concerned is exactly represented by a change in gel ratio before and after heating, and thus the present invention is completed.

That is, an acrylic derived adhesive used for polarizing plate of the present invention is an acrylic derived adhesive used for attachment of a polarizing plate, wherein a difference between a gel ratio after the adhesive is left to stand at room temperature for one month after coated and a gel ratio after the adhesive is further heated at 80° C. for 500 hours shows no more than 5%. Here, a gel ratio is obtained as follows; after a soluble component of the adhesive is extracted using a good solvent, residual insoluble component is taken out, the solvent is removed and dried, then the gel ratio is obtained as a percentage of a weight of the insoluble component (to initial weight). Practically the ratio may be measured by the method shown in the Example.

In the above-mentioned adhesive, preferably a peroxide component may not be comprised in the adhesive.

On the other hand, an optical member of the present invention comprises an adhesive layer comprising the above-mentioned adhesive for polarizing plate and at least one layer of a polarizing plate or a laminated body containing a polarizing plate.

In the above-mentioned optical member, preferably the polarizing plate or a laminated body containing a polarizing plate is a polarizing plate, a reflection type polarizing plate, a transflective layer type polarizing plate, or a polarized light separating polarizing plate or a laminated body obtained by laminating a retardation plate with each of the polarizing plate. Effect of the Invention In the adhesive for polarizing plate of the present invention, since a difference between a gel ratio after the adhesive is left to stand at room temperature for one month after coated and a gel ratio after the adhesive is further heated at 80° C. for 500 hours shows no more than 5%, a adhesive for polarizing plate excellent in long-term preservation quality is realized, as is shown in Examples. When the difference of gel ratio exceeds 5%, progress of cross-linking reaction is accelerated and resultant physical properties after long-term preservation of the adhesive becomes inferior. In addition, a coated layer is kept to stand for one month at room temperature so that the gel ratio may be stabilized.

If a peroxide component is not included in the adhesive, a progress of cross-linking reaction by the peroxide component remaining in the acrylic derived adhesive will be suppressed, and thus the adhesive for polarizing plate really excellent in long-term preservation quality is obtained by controlling the difference of the gel ratio no more than 5%.

On the other hand, since an optical member of the present invention has an adhesive layer comprising the adhesive for polarizing plate showing the above-mentioned effect, an optical member excellent in long-term preservation quality is realized.

When the above-mentioned polarizing plate or laminated body containing polarizing plate is a polarizing plate, a reflection type polarization plate, a transflective layer type polarizing plate, or a polarized light separating polarizing plate or a laminated body obtained by laminating a retardation plate with each of the polarizing plate, each of the plates is adhered on a liquid crystal cell etc. through adhesive layer, and therefore problems of the above long-term preservation may be induced in the layer. Therefore, the present invention showing the above-mentioned effect will especially become useful.

DETAILED DESCRIPTION OF THE INVENTION

Figure 1:
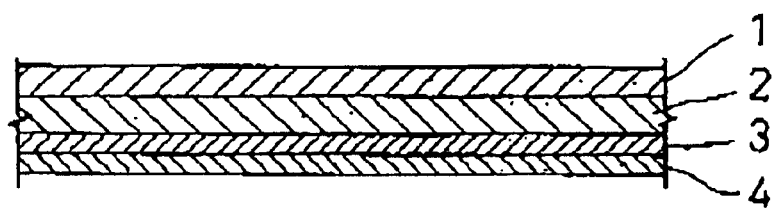
FIG. 1 is a sectional drawing showing an example of an optical member of the present invention.

Hereinafter, embodiments of the present invention will be described, referring to drawings.

An adhesive used for polarizing plate of the present invention is characterized in that a difference between a gel ratio after the adhesive is left to stand at room temperature for one month after coated and a gel ratio after the adhesive is further heated at 80° C. for 500 hours shows no more than 5% and that the difference of gel ratio is preferably no more than 4%. In the present invention an acrylic derived adhesive is used that is excellent in optical transparency, shows moderate adhesive properties, such as wettability and cohesiveness, and is excellent in weatherability, heat resistance, etc.

As the acrylic derived adhesive, an adhesive using acrylic derived copolymer obtained from a monomer containing 70 to 99 weight % of alkyl acrylate that has alkyl groups with 1 to 9 carbon atoms is preferable. An acrylic derived copolymer with a weight average molecular weight of 300000 to 2400000 in which a content of alkyl acrylate having alkyl groups that have 1 to 9 of carbon atoms is 70 to 99 weight %, and a content of a functional monomer having a carboxyl group and/or a hydroxyl group is 1 to 30 weight % is especially preferable. This acrylic derived copolymer gives an acrylic derived adhesive with preferable physical properties by being cross-linked with cross-linking agent.

The above-mentioned acrylic derived copolymer may be prepared using in percentage of 70–99 weight % of an alkyl acrylate having one kind or two kinds or more of alkyl groups with 1 to 9 carbon atoms and 1 to 30 weight % of functional monomer having one kind or two kinds or more of carboxyl groups and/or hydroxyl groups by suitable methods, such as solution polymerization method, emulsion polymerization method, suspension polymerization method, etc.

In the case a polymerization initiator is usually used, in order to control a difference of a gel ratio before and after heating within the above-mentioned range, in the present invention, it is preferable not to use polymerization initiator of peroxide derived, such as benzoyl peroxide, acetyl peroxide, lauroyl peroxide and dicumyl peroxide. Therefore, as polymerization initiators, it is preferable to use azo nitrile compounds, such as azobisisobutyronitrile, azo derived initiators, such as dialkyl azo compounds and diarylalkyl azo compounds, and disulfide derived initiators, etc.

Moreover, polymerization initiator of peroxide derived is not used in order to control a difference of a gel ratio before and after heating within the above-mentioned range, and at the same time it is effective to adopt a method etc. not to use cross-linking agent of peroxide derived, in case acrylic derived copolymer is cross-linked.

As the above-mentioned alkyl acrylates, alkyl acrylates that have linear type or branched type chain having alkyl groups with 1 to 9 carbon atoms, for example, methyl group, ethyl group, n-propyl group, isopropyl group, n-butyl group, isobutyl group, amyl group, hexyl group, octyl group, 2-ethyl hexyl group, and isononyl group may be used.

As functional monomers, for example, compounds containing carboxyl groups that have C=C bond and 3 to 10 carbon atoms, such as, acrylic acid, methacrylic acid, itaconic acid, crotonic acid, isocrotonic acid, maleic acid, and maleic anhydride, and compounds containing hydroxyl groups that have C=C bond and 2 to 10 carbon atoms, such as, 2-hydroxyethyl acrylate, 2-hydroxyethyl methacrylate, 2-hydroxypropyl acrylate, 2-hydroxypropyl methacrylate, and allyl alcohol may be used.

Functional monomers may contain two or more carboxyl groups or hydroxyl groups, and may contain one or more of both carboxyl groups and hydroxyl groups. Moreover, compounds containing two or more carboxyl groups may be modified to form anhydrides.

The above-mentioned acrylic derived copolymer preferably used in the present invention has a weight average molecular weight of 300000 to 2400000, and preferably of 350000 to 2350000, and more preferably of 400000 to 2300000.

Acrylic derived adhesive may be prepared by methods in which cross-linking agent is blended into a solution of the above-mentioned acrylic derived copolymer. As cross-linking agent to be blended, for example, suitable cross-linking agents, such as polyisocyanate derived cross-linking agent, epoxy derived cross-linking agent, metal chelate derived cross-linking agent, amino resin derived cross-linking agent, and etc. may be used. The amount of cross-linking agent used is suitably determined according to types of acrylic derived copolymer or to cross-linking agent so that a predetermined cohesive force may be demonstrated. Generally cross-linking agent may be used in an amount of 0.1 to 15 weight parts, and preferably 0.2 to 10 weight parts, and more preferably 0.3 to 5 weight parts per acrylic derived copolymer 100 weight parts.

As solvents used for acrylic derived adhesive, ester, ketone, aliphatic hydrocarbon, aromatic hydrocarbon, etc. may be mentioned, and it is preferable to use the solvent that is used in solution polymerization as it is.

Formation of adhesive layer to polarizing plate is performed by proper coating method or method in which layer prepared on separator is transferred, etc. It is preferable that the surface of the adhesive layer is protected with separators etc. until the adhesive layer is presented to practical use when the adhesive layer appears on surface. The adhesive layer may contain fine particles to obtain optical diffusion property. Thickness of adhesive layer may be determined suitably according to a purpose of use, and generally is set to 1 to 500 µm.

Figure 2:
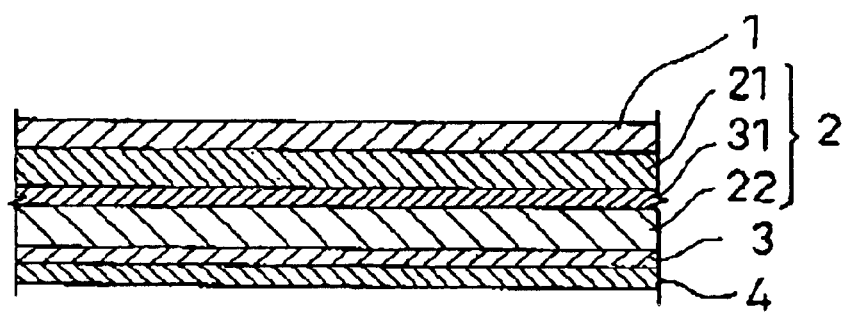
FIG. 2 is a sectional drawing showing another example of an optical member of the present invention.

An optical member of the present invention comprises a adhesive layer comprising the above-mentioned adhesive for polarizing plate and at least one layer of a polarizing plate or a laminated body containing a polarizing plate. The examples are shown in FIGS. 1 and 2. In an optical member shown in FIG. 1, a protective film 1 is prepared on upper surface side of an optical material 2 that is polarizing plate and an adhesive layer 3 is prepared on under surface side, and further a separator 4 is disposed. Moreover, in an optical member shown in FIG. 2, an optical material 2 shown in FIG. 1 is formed by an elliptically polarizing plate in which a polarizing plate 21 and a retardation plate 22 are laminated through an adhesive layer 31. A protective film 1 is prepared on upper surface side of the elliptically polarizing plate, and an adhesive layer 3 is prepared on under surface side, and further a separator 4 is disposed.

As the above-mentioned polarizing plate and laminated body containing polarizing plate is a polarizing plate, a reflection type polarization plate, a transflective layer type polarizing plate, or a polarized light separating polarizing plate or a laminated body obtained by laminating a retardation plate with each of the polarizing plate is preferable. In addition, in laminated bodies, proper adhesion means, such as adhesive layer of the present invention and other adhesive layer, may be used for laminating.

Examples of the polarizing plate include a polarizing film obtained by allowing a dichroic substance such as iodine or a dye to be adsorbed onto a hydrophilic polymer film such as a polyvinyl alcohol series film, partially formalized polyvinyl alcohol series film, ethylene/vinyl acetate copolymer series partially saponified film, and stretching the film; or a polyene oriented film such as a dehydrated product of polyvinyl alcohol or a dehydrochlorinated product of polyvinyl chloride.

On the other hand, the reflecting type polarizing plate is for forming a liquid crystal display or the like of a type such that the incident light from the viewing side (display side) is reflected for display. This has an advantage in that the incorporation of a light source such as a backlight can be omitted to facilitate fabrication of a liquid crystal display having a reduced thickness. The reflecting type polarizing plate may be formed by a suitable method such as a method of attaching a reflecting layer made of metal or the like onto one surface of a polarizing film, optionally via a transparent protective layer or the like. A protective film 1 may also serve as the above-mentioned polarizing plate and especially a transparent resin layer prepared in one side or both sides of a polarizing film.

A specific example of the reflecting type polarizing plate may be one in which a foil or a vapor-deposited film made of a reflecting metal such as aluminum is attached onto one surface of a transparent protective layer made of an optionally matted film or the like. The reflecting type polarizing plate may be one having a reflecting layer of a fine undulating structure on the aforesaid diffusing type transparent protective layer. The reflecting layer is preferably used in a state in which the reflecting surface thereof is covered with a transparent protective film, a polarizing plate, or the like, in view of preventing decrease in the reflectivity caused by oxidation, hence long-term duration of initial reflectivity, avoidance of separately attaching a protective layer, and other reasons.

The aforesaid reflecting layer having a fine undulating structure has advantages such as preventing directivity or glittering appearance by diffusing the incident light by random reflection, thereby restraining the unevenness of brightness. Also, the transparent protective layer containing fine particles has such an advantage that the incident light and the reflected light thereof are diffused while passing therethrough, whereby the unevenness of brightness and darkness can be further restrained. The reflecting layer of a fine undulating structure reflecting the surface fine undulating structure of the transparent protective layer can be formed, for example, by attaching metal directly onto the surface of a transparent protective layer with the use of a suitable method of vapor deposition type such as the vacuum vapor deposition method, the ion plating method, or the sputtering method or plating type or the like.

The protective film or the transparent protective layer may be made of polymers, excellent in transparency, mechanical strength, thermal stability, moisture shielding property, isotropic property, and others. The polymers include, for example, polyester, cellulose acetate, polyethersulfone, polycarbonate, polyamide, polyimide, polyolefin, or acrylic resin or thermosetting or ultraviolet-curing resin such as acryl series, urethane series, acrylurethane series, epoxy series, or silicone series, or the like.

The transparent protective layer may be formed by a suitable method such as a method of coating a polymer or a method of laminating those made into films, and the thickness thereof may be suitably determined. The thickness is typically at most 500 $\mu$m, preferably from 1 to 300 $\mu$m, more preferably from 5 to 200 $\mu$m. The fine particles to be contained in the aforesaid transparent protective film may be, for example, suitable transparent particles such as inorganic fine particles made of silica, alumina, titania, zirconia, tin oxide, indium oxide, cadmium oxide, antimony oxide, or the like having an average particle size of from 0.5 to 20 $\mu$m, which may be electrically conductive, or organic fine particles made of a cross-linked or non-cross-linked polymer or the like. The amount of fine particles to be used is typically from 2 to 25 parts by weight, preferably from 5 to 20 parts by weight, with respect to 100 parts by weight of the transparent resin.

Meanwhile, specific examples of the aforesaid retardation plate include birefringent films obtained by stretching a film made of a suitable polymer such as polycarbonate, polyvinyl alcohol, polystyrene, polymethyl methacrylate, polyolefin such as polypropylene, polyallylate, or polyamide, oriented film of liquid crystal polymer. The retardation plate may be made of a laminate of two more thereof to control optical property such as phase difference.

Moreover, a plate in which a polarizing plate or reflection type polarizing plate, and a retardation plate are laminated in proper combination develops a function as an elliptically polarizing plate or a reflected type elliptical polarizing plate. In manufacturing process of a liquid crystal display, this elliptically polarizing plate etc. may also be manufactured by laminating those plates separately one by one so that a combination of a polarizing plate (reflected type) and a retardation plate may be realized, as is described above. The plate combined beforehand as an elliptically polarizing plate etc. may develop stable quality and may be excellent in workability in laminating process etc., and moreover has an advantage in outstanding manufacturing efficiency of a liquid crystal display. In addition, a circular polarizing plate may also be used depending on type of retardation plate.

A transflective layer type polarizing plate is a polarizing plate in which a reflective layer of reflection type polarization plate is changed into a transflective type reflective layer. If this transflective layer type polarizing plate is used, a liquid crystal display may be recognized by viewing, in sunlight etc., in a reflective mode, that is, in a state of the backlight put off, and at night or in a darkroom, in a transparent mode, that is, in a state of the backlight turned on, by configuring the transflective type reflective layer through a polarizing plate on a backlight side of a liquid crystal cell with a backlight.

As a polarized light separating plate, following suitable plate may be used; for example, a layer that shows a characteristic of transmitting a linear polarized light with a predetermined polarization axis and reflecting other light, such as a multilayer thin film of dielectrics, or a multilayer laminated material of thin films having different refractive indexes anisotropy; as well as, a layer that shows a characteristic of reflecting circularly polarized light of either left-handed rotation or right-handed rotation, and transmitting other light, such as a layer in which a cholesteric liquid crystal layer, especially an orientated film of a cholesteric liquid crystal polymer, and its orientated liquid crystal layer are supported on a film substrate.

In the aforesaid polarized light separating plate of a type that transmits a linearly polarized light of a predetermined polarizing axis, the light can be efficiently transmitted while restraining the absorption loss by the polarizing plate, by allowing the transmitted light to be incident, as it is, into the polarizing plate with aligned polarized axis. On the other hand, in the polarized light separating plate of a type that transmits a circular polarized light, such as a cholesteric liquid crystal layer, it is preferable to allow the light to be incident into the polarizing plate after converting the transmitted circular polarized light into a linearly polarized light via a retardation plate instead of allowing the light to be incident, as it is, into the polarizing plate to restrain the absorption loss. The circular polarized light can be converted into a linearly polarized light by using a quarter wavelength plate as the retardation plate.

A retardation plate that functions as a quarter wavelength plate in a wide wavelength range such as a visible light region can be obtained by a method such as superposing a retardation layer that functions as a quarter wavelength plate to a monochroic light such as a 550 nm wavelength light, onto a retardation layer that shows a different retardation characteristics, for example, a retardation layer that functions as a half wavelength plate. Therefore, the retardation plate to be disposed between the polarizing plate and the polarized light separating plate may be made of one or more layers of retardation layers.

Also, as to the cholesteric liquid crystal layer, one can obtain a layer that reflects a circular polarized light in a wide wavelength range such as a visible light region by providing a configuration structure in which two or more layers are superposed using a combination of layers having different reflection wavelengths.

The polarizing plate, the retardation plate, the protective film, the adhesive layer or the adhesive layer constituting the optical member may be allowed to have an ultraviolet absorbing capability by a method of treating with a ultraviolet absorber such as a salicylic acid ester series compound, a benzophenol series compound, a benzotriazol series compound, a cyanoacrylate series compound, or a nickel complex salt series compound.

An optical member of the present invention may be adhered onto proper members, such as a liquid crystal cell, through an adhesive layer. It is preferable to be used for a liquid crystal display of the present invention on which at least one above-mentioned optical member is adhered onto a liquid crystal cell.

EXAMPLES

Hereinafter, Example showing a constitution and an effect of the present invention concretely will be described.

Example 1

Butyl acrylate 100 g, acrylic acid 5 g, and azobisisobutyronitrile 0.5 g were added to ethyl acetate 100 g within a flask, and polymerization was carried out for 8 hours at 60° C. to obtain a polymer solution. To acrylic polymer 100 weight parts obtained, an isocyanate derived cross-linking agent 0.5 weight part (trade name: Collonate L, by NIPPON POLYURETHANE INDUSTRY CO., LTD.) was added, and an adhesive syrup was obtained.

On a releasing film with a thickness of 38 µm made of polyester, the adhesive syrup obtained above was coated so that a thickness of the adhesive layer after dried might be set to 25 µm. On the other hand, a polyvinyl alcohol film with a thickness of 80 µm was stretched 5 times in iodine aqueous solution and then dried. A triacetyl cellose film was adhered onto both sides of the stretched film obtained through an adhesive to obtain a polarizing plate. The above-obtained coated adhesive layer film was adhered to this polarizing plate, and optical member was produced.

Comparative example 1

In Example 1, optical member was produced as in Example 1 except having used benzoyl peroxide instead of azobisisobutyronitrile.

Evaluation Examination

After leaving the adhesives obtained in Example and Comparative example at room temperature for one month after coated, and after further leaving them at 80° C. for 500 hours, gel ratio was measured for each of the samples, and the amount of change before and after heating (=(a gel ratio after 500 hour at 80° C.)−(gel ratio one month after coated)) was calculated.

Gel ratio was obtained in a following method. After weighing only the adhesive taken out and being left for one week or more at room temperature in ethyl acetate, only insoluble matter was taken out. After solvent contained in insoluble matter was dried and removed, weighed to obtain gel ratio according to an equation; gel ratio=((insoluble matter weight)/(initial weight))×100 (%).

Moreover, adhesive strength of initial stage after leaving the adhesive in Example and Comparative example at room temperature for 30 days after coated, and adhesive strength after long-term preservation after leaving them at room temperature for 24 months after coated were measured. Measurement of adhesive strength was performed by the following methods. Sample was cut by width of 25 mm and adhered with pressure by a rubber roll of 2 Kg weight going to and returning on a glass plate. Subsequently, after performing autoclave processing for 15 minutes, under a condition of 50° C. and 0.49 MPa, measuring was performed by peeling at an angle of 90° (at tension speed of 300 mm/min. and at 23° C.).

TABLE 1

|  | Example 1 | Comparative Example 1 |
| --- | --- | --- |
| Gel ratio after one month after coated | 75.1% | 81.6% |
| Gel ratio after heated at 80° C., for 500-hour | 78.1% | 93.4% |
| Amount of change of gel ratio | 3.0% | 11.8% |
| Initial adhesive strength (N/25 mm) | 10.1 | 9.8 |
| Adhesive strength after long-term preservation (N/25 m) | 10.6 | 6.7 |

As comparison of results in Example and Comparative example shows clearly, when a peroxide component is not contained in a adhesive, a change of gel ratios after heated at 80° C. for 500 hours may be controlled within 5%. A adhesive having almost no decrease in adhesive strength after long-term preservation, and is excellent in long-term preservation quality is realized.

What is claimed is:

1. An optical member comprising an acrylic adhesive used for attachment of a polarizing plate, wherein a difference between a gel ratio after the adhesive is left to stand at room temperature for one month after coated and a gel ratio after the adhesive is further heated at 80° C. for 500 hours shows no more than 5%, and at least one layer of a polarizing plate or a laminated body containing a polarizing plate.

2. The optical member according to claim 1, wherein a peroxide component is not comprised in the adhesive.

3. The optical member according to claim 1, wherein the polarizing plate or laminated body containing a polarizing plate is a polarizing plate selected from the group consisting of a reflective polarizing plate, a transflective layer polarizing plate, and a polarized light separating polarizing plate.

4. The optical member according to claim 1, wherein the polarizing plate or laminated body containing a polarizing plate is a laminated body obtained by laminating a retardation plate with each of the polarizing plate.

5. The optical member according to claim 1, wherein the gel ratio is no more than 3%.

6. The optical member according to claim 1, wherein the acrylic pressure sensitive adhesive layer contains a base polymer having an acrylic acid ester as a main component.

7. The optical member according to claim 1, wherein the at least one layer of a polarizing plate or a laminated body containing a polarizing plate is obtained by causing iodine and/or a dichroic dye to be adsorbed on a hydrophobic polymer film, followed by orientation.

* * * * *